US012249169B1

(12) United States Patent
Agrawal et al.

(10) Patent No.: US 12,249,169 B1
(45) Date of Patent: Mar. 11, 2025

(54) PROCESSING MULTIPLE DOCUMENTS IN AN IMAGE

(71) Applicant: American Express Travel Related Services Company, Inc., New York, NY (US)

(72) Inventors: Tamanna Agrawal, Kosabadi (IN); Shivshankar Reddy, Bangalore (IN); Himanshu Sharad Bhatt, Bangalore (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/392,610

(22) Filed: Dec. 21, 2023

(51) Int. Cl.
*G06V 30/148* (2022.01)
*G06V 10/82* (2022.01)
*G06V 30/146* (2022.01)
*G06V 30/40* (2022.01)

(52) U.S. Cl.
CPC ............ *G06V 30/158* (2022.01); *G06V 10/82* (2022.01); *G06V 30/1463* (2022.01); *G06V 30/147* (2022.01); *G06V 30/40* (2022.01)

(58) Field of Classification Search
CPC ...... G06V 30/40; G06V 30/47; G06V 30/158; G06V 30/1463; G06V 10/82
See application file for complete search history.

(56) References Cited

U.S. PATENT DOCUMENTS

| | | | | |
|---|---|---|---|---|
| 8,208,725 | B2* | 6/2012 | Ferman | G06V 30/1463 715/204 |
| 8,275,168 | B2* | 9/2012 | Gao | H04N 1/32208 382/100 |
| 10,783,400 | B2* | 9/2020 | Kriegman | G06V 30/40 |
| 11,341,605 | B1* | 5/2022 | Singh | H04L 67/1095 |
| 11,509,795 | B2* | 11/2022 | Lund | G06N 20/00 |
| 11,900,644 | B2* | 2/2024 | Maggio | G06V 10/25 |
| 2013/0044356 | A1* | 2/2013 | Lee | G06V 30/268 358/474 |
| 2016/0125613 | A1* | 5/2016 | Shustorovich | G06V 10/242 382/140 |

FOREIGN PATENT DOCUMENTS

WO WO-2016200667 * 12/2016 ............. G06F 17/30

* cited by examiner

*Primary Examiner* — Daniel G Mariam
(74) *Attorney, Agent, or Firm* — Thomas Horstemeyer, LLP (57) ABSTRACT

Disclosed are various embodiments for processing multiple documents in an image. First, text from each of one or more documents in an image can be identified. An orientation of each of the one or more documents can be determined based at least in part on an alignment of the text of each of the one or more documents. Additionally, using an object detection model, the one or more documents in the image can be identified based at least in part on the orientation of each of the one or more documents. Finally, the one or more documents can be separated from the image into one or more separate image files, each separate image file representing a respective document of the one or more documents.

30 Claims, 5 Drawing Sheets

PROCESSING MULTIPLE DOCUMENTS IN AN IMAGE

BACKGROUND

In many cases, a person may wish to scan multiple documents at one time. The ability to scan multiple documents at one time can expedite scanning, thereby increasing efficiency of document processing. While a person may be able to readily distinguish between different documents in a single scanned image, it can be difficult for computer programs to distinguish these documents in an image for numerous reasons. Thus, a person may have to go to significant effort to ensure that the quality of the scan and the arrangement of the documents within the scanned image are sufficient for document processing. However, such efforts detract from the efficiency of scanning multiple documents at once.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for processing multiple documents in an image. There are many circumstances in which a user may wish to scan multiple documents at once. For example, in the context of mobile banking applications, a user may wish to scan multiple checks at once to make a mobile deposit. In another example, an organization may wish to distinguish between the front and back of an identification card stored in a single image. Additionally, an enterprise may receive images of multiple bills, receipts, or invoices which require separation in order for a billing department to process the documents. However, many systems rely on the user to separate the documents before scanning, to ensure that the documents are flat and easily distinguishable, and that there is no overlap between documents.

In contrast to other approaches, the approaches herein do not rely on any assumptions about the documents in an image. For example, while many scanning and image processing applications assume that there will be four corners to a document or four vertices, the approaches herein make no such assumption. Additionally, the various embodiments of the present invention are domain agnostic, and can be applied to any document type, size, format, etc. Similarly, the approaches herein are language agnostic and do not rely on any assumptions about the type of language which may be in a document. Instead of relying on assumptions based on a high-quality, low-distortion image of a document, the approaches herein can identify and separate documents in complex and distorted images.

As such, various embodiments of the present disclosure are directed to providing systems and methods for processing images of multiple documents and separating the documents into separate files for further processing. A user can scan multiple documents at once, where the documents may be creased, partially folded, overlapping, and/or placed on low-contrast or busy backgrounds, as well as may have differing arrangements or orientations. A segmentation service can correct various aspects of the image before utilizing an object detection model to identify and separate the different documents into separate image files. Then, the segmentation service can send the separate image files to further processing systems.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
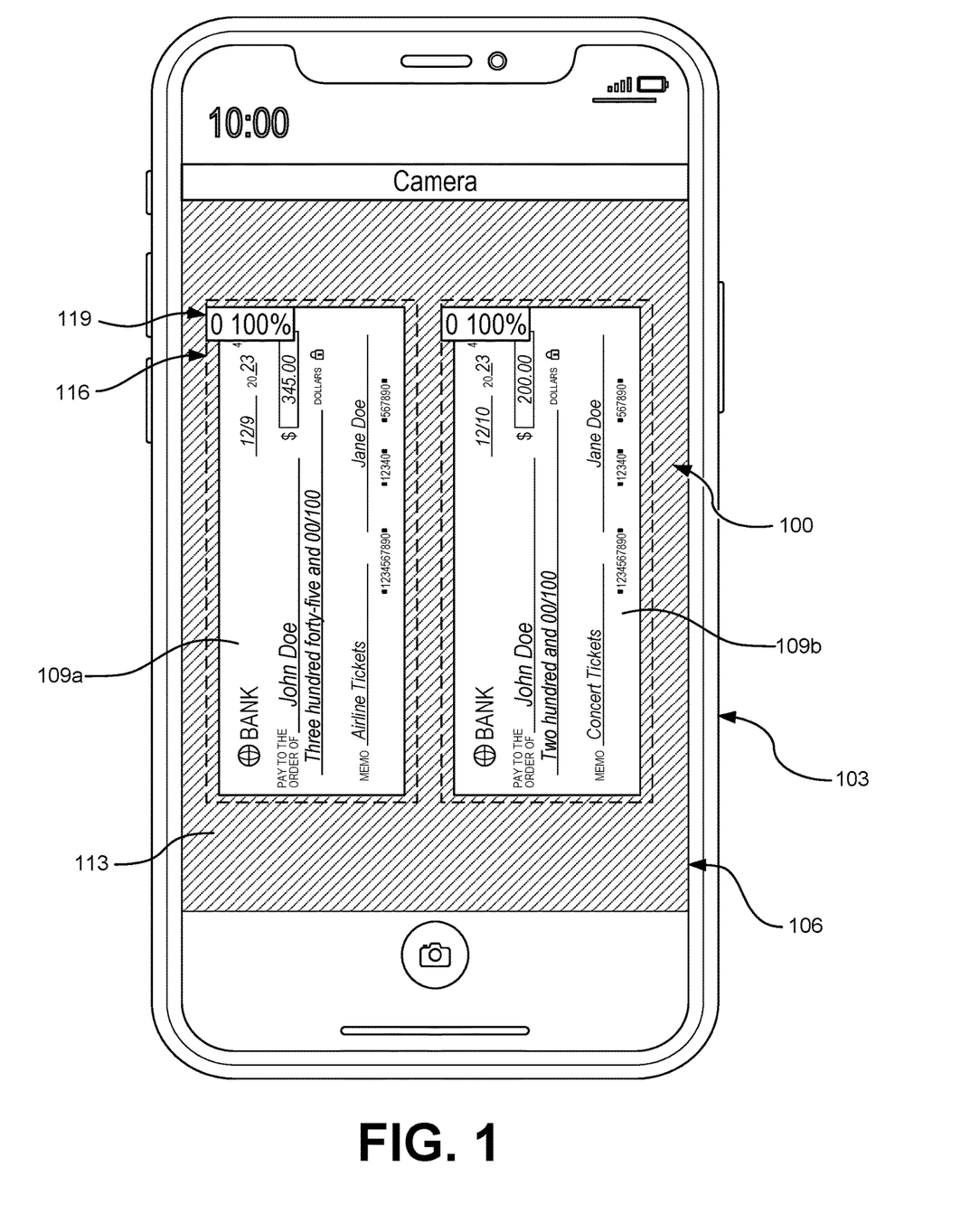
FIG. 1 is a pictorial diagram of an example user interface rendered by a client according to various embodiments of the present disclosure.

FIG. 1 depicts an example user interface 100 of a client device 103 according to various embodiments of the present disclosure. In the example of FIG. 1, the user interface 100 of the client device 103 displays an image 106 of two documents 109a and 109b on a colorful background 113. Each document 109 has been identified within the image 106 and has its edges demarcated with a bounding box 116. While FIG. 1 depicts space between each bounding box 116 and the edges of the documents 109a and 109b, in some embodiments, a bounding box 116 traces the edges of the document 109 without any space between. Additionally, each bounding box 116 can include a score 119 which can indicate an accuracy, confidence, or other metric about the bounding box 116.

In various examples, an image 106 can contain multiple documents 109. As shown in FIG. 1, the image 106 includes two documents 109a and 109b and a background 113. While depicted in FIG. 1 as being captured with a camera application on a client device 103, the image 106 can be obtained using any camera, scanner, or other imaging device. Additionally, the image 106 can be imported into any application on a client device 103, such as a camera application, a scanning application, a social media application, banking application, or other application which can access and process images 106.

The documents 109a and 109b shown in the example of FIG. 1 are negotiable instruments (e.g., checks). However, in some examples, other documents 109 can be identified and separated from an image 106. A document 109 can be representative of a check, a bill, a receipt, an invoice, an identification card, a hand-written note, a list, a letter, or any other type of document. While the documents 109a and 109b of FIG. 1 are depicted as having the same orientation and lying flat and separated on the background 113, the documents 109 in an image 106 can also be partially folded, creased, torn, raised, overlapping, and in different orientations. Additionally, each document 109 can include text. The text in a document 109 can include any combination of alphanumerics or symbols from any language. In some embodiments, the documents 109 can include graphics, pictures, or other internal images in addition to text.

The background 113 can be representative of any surface or base upon which the documents 109 appear in the image 106. In some embodiments, the background 113 can represent a reflective mat of a scanner lid, a surface on which the documents 109 were placed, or other form of background 113 for the documents 109. In some examples, the background 113 can be white, providing no contrast with documents 109 and making it difficult to discern the edges of the documents 109. In some embodiments, the background 113 can be colorful, having a one or more different colors. The background 113 can also be solid or patterned, include miscellaneous designs, text, images, or other noise which can make it difficult to determine the edges or vertices of a document 109.

The bounding boxes 116 can represent the identified boundaries of a document 109. In some embodiments, the bounding boxes 116 can be dashed lines as depicted in FIG. 1. In some embodiments, the bounding boxes 116 can be represented by solid lines, dotted lines, dash-dot lines, transparent lines, or other mark which represents the detected edges of a document 109. Additionally, a bounding box 116 can be formed from any color.

In some embodiments, the score 119 accompanying a bounding box 116 can be a percentage, ratio, letter, or other measure indicating an accuracy or confidence of a property on the bounding box 116. While FIG. 1 depicts the score 119 as being located near the top-left corner of the bounding box 116, the score 119 can appear anywhere within or adjacent to the bounding box 116. In some embodiments, displaying the bounding boxes 116 and/or the scores 119 is an optional feature which can be turned on or off.

Figure 2A:
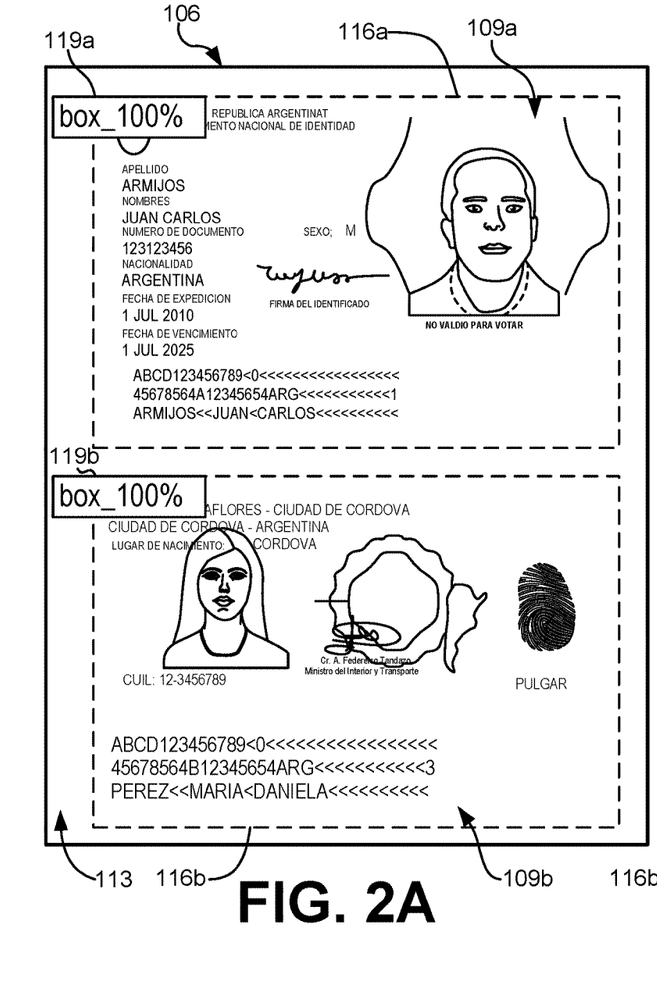
FIGS. 2A and 2B are drawings each depicting one of several embodiments of the present disclosure.
Figure 2B:
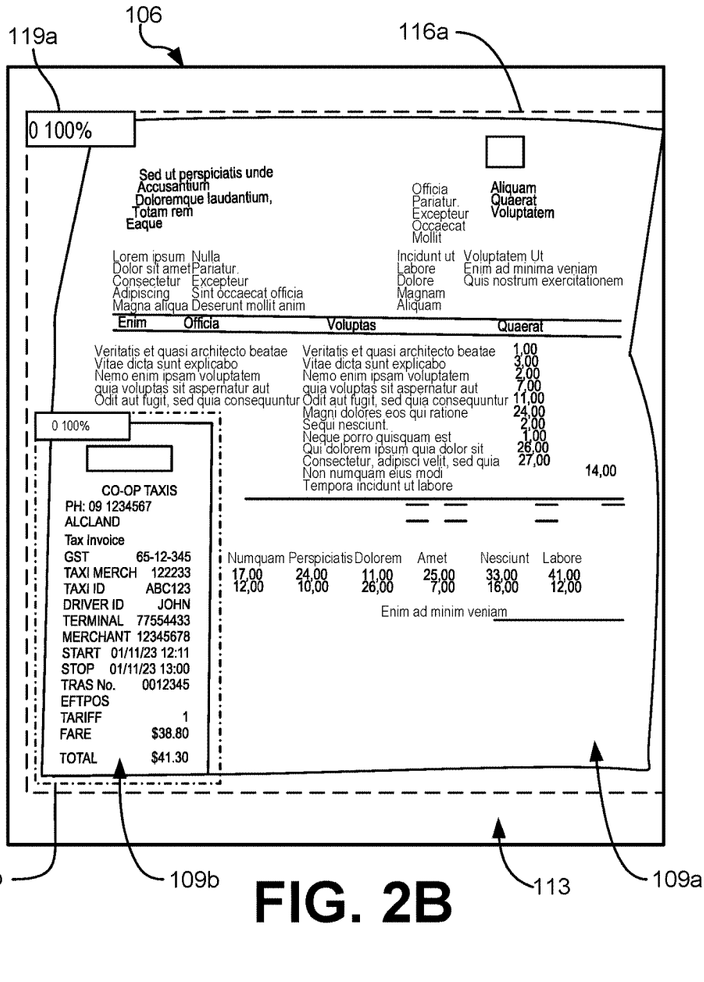

With reference to FIGS. 2A and 2B, shown are various examples of images 106 of documents 109 which have been identified. The following examples are intended to be illustrative and non-limiting regarding the types of documents 109 which can be identified from an image 106 in various embodiments of the present disclosure.

In FIG. 2A, shown is an example of an image 106 of the front and back of an identification card. The front of the identification card represents a first document 109a, while the back of the identification card represents a second document 109b. These two documents 109a and 109b can be identified by the system described herein and enclosed in bounding boxes 116a and 116b, where bounding box 116a corresponds to document 109a and bounding box 116b corresponds to document 109b. As shown in FIG. 2A, although the boundaries or edges of each document 109 can be indistinguishable from the background 113, the documents 109 can be distinguished from one another and bounding boxes 116 applied. The scores 119a and 119b can be included with the bounding boxes 116a and 116b as well.

In FIG. 2B, two documents 109a and 109b are shown where the first document 109a is an invoice and the second document 109b is a receipt. The example of FIG. 2B demonstrates that documents 109a and 109b in a single image 106 can be different document types, different shapes, and sizes, have different patterns of text, and overlap at least partially, as shown in the example of FIG. 2B. Additionally, the documents 109a and 109b can be folded or have otherwise abnormal edges. Each document 109 can be identified and enclosed in a respective bounding box 116.

Figure 3:
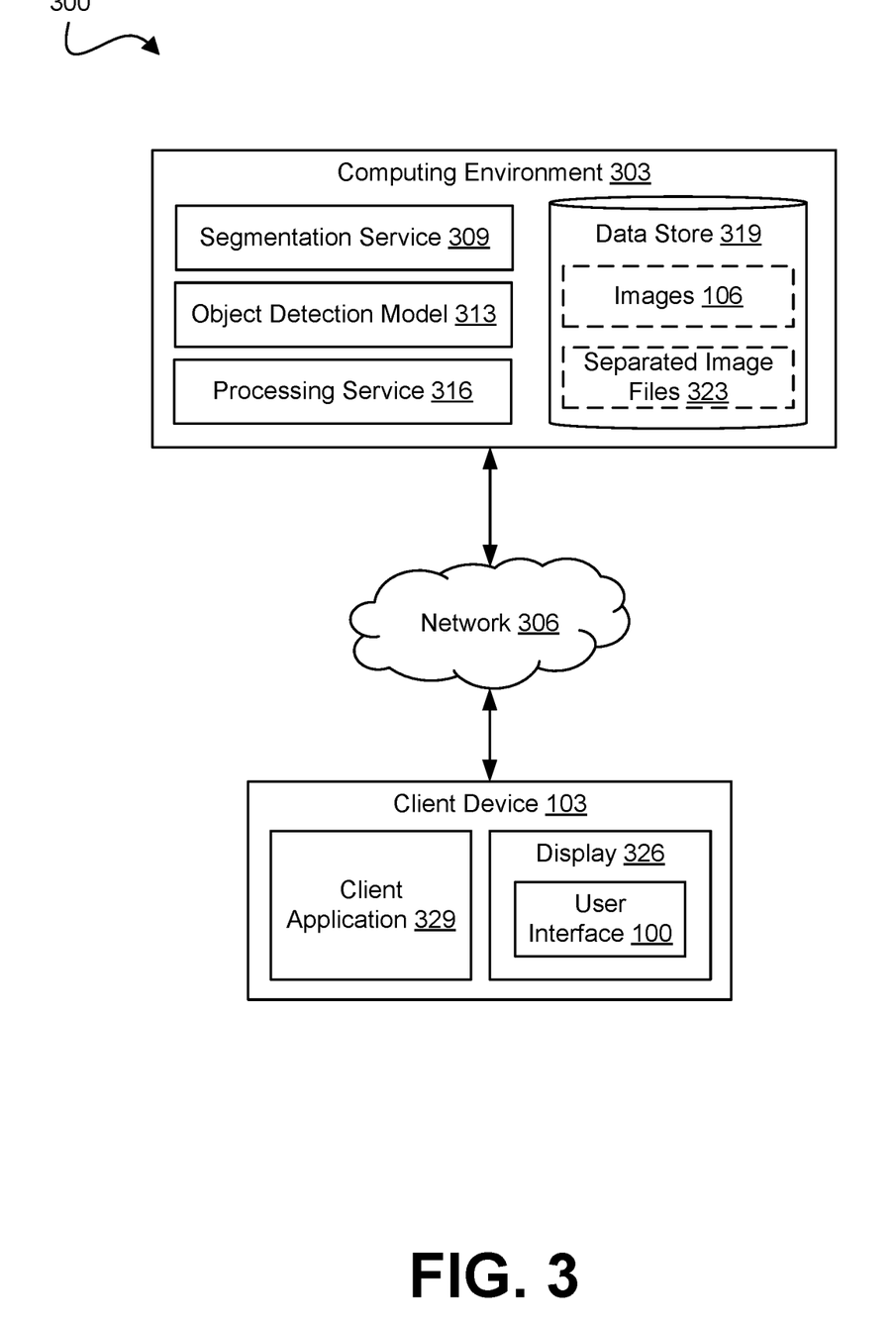
FIG. 3 is a drawing of a network environment according to various embodiments of the present disclosure.

Moving now to FIG. 3, shown is a network environment 300 according to various embodiments. The network environment 300 can include a computing environment 303 and a client device 103, which can be in data communication with each other via a network 306.

The network 306 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 306 can also include a combination of two or more networks 306. Examples of networks 306 can include the Internet, intranets, extranets, virtual private networks (VPNs), and similar networks.

The computing environment 303 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 303 can employ a plurality of computing devices that can be arranged in one or more server banks or computer banks or other arrangements. Such computing devices can be located in a single installation or can be distributed among many different geographical locations. For example, the computing environment 303 can include a plurality of computing devices that together can include a hosted computing resource, a grid computing resource, or any other distributed computing arrangement. In some cases, the computing environment 303 can correspond to an elastic computing resource where the allotted capacity of processing, network, storage, or other computing-related resources can vary over time.

Various applications or other functionality can be executed in the computing environment 303. The components executed on the computing environment 303 include a segmentation service 309, an object detection model 313, a processing service 316, and other applications, services, processes, systems, engines, or functionality not discussed in detail herein.

The segmentation service 309 can be executed to determine an orientation of the image 106 and the one or more documents 109 within the image 106. By identifying sections of text in each document 109, the segmentation service 309 can determine the orientation of each document 109 with respect to other documents 109 in the image 106 as well as with respect to the image 106 itself. The segmentation service 309 can be executed to correct various aspects of the image 106, such as the orientation of the documents 109 or the tilt, rotation, clarity, color, shading, or other aspect of the image 106 and the documents 109 within. The segmentation service 309 can use the object detection model 313 to identify the documents 109 from within the image 106 and use the output from the object detection model 313 to separate the documents 109 into their own respective separated image files 323. In some embodiments, the segmentation service 309 can determine the document type of each document 109 and send the separated image files 323 to a processing service 316 based at least in part on the document type identified.

The object detection model 313 can represent a machine learning model which is trained to perform various computer vision tasks. In some embodiments, the object detection model 313 can be a region-based convolutional neural network (RCNN), a Fast-RCNN, a Faster RCNN, a Mask RCNN, or a Mesh RCNN. The object detection model 313 can be executed to receive an image 106. In some embodiments, the object detection model 313 can identify regions of interest (ROIs) as candidates for potential documents 109 within an image 106. The ROIs can be identified based at least in part on text, graphics, layout, corners, vertices, edges, or other features of a document 109. The object detection model 313 can be further executed to output bounding boxes 116 encompassing the various ROIs identified in the image 106. In some embodiments, the object detection model 313 can generate a score 119 for each bounding box 116 based at least in part on a confidence in the accuracy of the bounding box 116. The object detection model 313 can further include a filter, such as a rule-based logic filter which can be configured to remove spurious bounding boxes 116. Spurious bounding boxes 116 can be representative of erroneous results or false positives which do not properly identify a document 109 within an image 106. Although depicted separately for clarity, the functionality provided by the object detection model 313 can be included in the segmentation service 309 in various embodiments of the present disclosure. In some embodiments, the object detection model 313 can be a part of the segmentation service 309. In some embodiments, the object detection model 313 can be separate from the segmentation service 309, and the segmentation service 309 can send the modified image 106 to the object detection model 313 to identify the documents 109 within an image 106. The segmentation service 309 can be executed to receive the identified documents 109 in an image 106 from the object detection model 313.

The processing service 316 can represent a system or service which can be executed to further process the separated image files 323. According to various examples, the processing service 316 can extract data from the separated image files 323 and use that data in downstream applications. For example, the processing service 316 can be a banking service which processes scanned checks to deposit into a banking system. In another example, the processing service 316 can be an optical character recognition (OCR) engine which extracts text from the document and analyzes it for various applications. In some embodiments, the processing service 316 is a billing service which extracts information from documents such as receipts, invoices, etc. to allocate payments and reimbursements as well as generate new bills. According to various examples, the processing service 316 is an identification verification service which can be executed to extract data from an identification document, cross check the data against one or more databases, and determine whether the identification document is verified.

Also, various data is stored in a data store 319 that is accessible to the computing environment 303. The data store 319 can be representative of a plurality of data stores 319, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 319 is associated with the operation of the various applications or functional entities described below. This data can include images 106, separated image files 323, and potentially other data.

The images 106 can represent files which contain graphic data, such as photographs or scans of documents 109. The images 106 can be many different file types, such as a Join Photographic Experts Group (JPEG/JPG), bitmap (BMP), Portable Network Graphics (PNG), Tagged Image File Format (TIFF), Photoshop Document (PSD), Portable Document Format (PDF), a RAW format, or other file types. In some embodiments, the images 106 can be stored as black-and-white, grayscale, or color images 106, such as cyan, yellow, magenta, and key (CYMK) or red, green, and blue (RGB) images 106.

The separated image files 323 can represent files which contain graphic data, similar to the images 106 described above. As such, the separated image files 323 can be stored as many different file types, such as JPEG/JPG, BMP, PNG, TIFF, PSD, PDF, a RAW format, or other file types. In some embodiments, the separated image files 323 can be stored as black-and-white, grayscale, or color images, such as CYMK or RGB images. The separated image files 323 can represent new image files output by the segmentation service 309. For example, the separated image files 323 can be new image files generated from the original image 106 which was input to the segmentation service 309, where each of the new image files represents one of the documents 109 that was identified in the original image 106.

The client device 103 is representative of a plurality of client devices that can be coupled to the network 306. The client device 103 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 can include one or more displays 326, such as liquid crystal displays (LCDs), gas plasma-based flat panel displays, organic light emitting diode (OLED) displays, electrophoretic ink ("E-ink") displays, projectors, or other types of display devices. In some instances, the display 326 can be a component of the client device 103 or can be connected to the client device 103 through a wired or wireless connection.

The client device 103 can be configured to execute various applications such as a client application 329 or other applications. The client application 329 can be executed in a client device 103 to access network content served up by the computing environment 303 or other servers, thereby rendering a user interface 100 on the display 326. To this end, the client application 329 can include a browser, a dedicated application, or other executable, and the user interface 100 can include a network page, an application screen, or other user mechanism for obtaining user input. The client device 103 can be configured to execute applications beyond the client application 329 such as email applications, social networking applications, word processors, spreadsheets, or other applications.

Next, a general description of the operation of the various components of the network environment 300 is provided. Although the following description provides an example of the interactions between the various components of the network environment 300, other interactions or sequences of interactions are encompassed by the various embodiments of the present disclosure.

To begin, the segmentation service 309 can receive an image 106 for processing. The segmentation service 309 can identify text in the image 106 and use the identified text to determine an orientation of one or more documents 109 within the image 106. In some embodiments, segmentation service 309 can modify the image 106 to enhance image quality. The segmentation service 309 can use an object detection model 313 to identify the documents 109 in the image 106. In some embodiments, the object detection model 313 uses computer vision techniques to identify regions of interest within an image 106 and output bounding boxes 116 for each respective region of interest.

Once the object detection model 313 has returned the bounding boxes 116, the segmentation service 309 can separate the documents 109 from the image 106 and store them as separated image files 323, with one document 109 per separated image file 323. According to various examples, the segmentation service 309 can determine a document type for the document 109 in each separated image file 323. The segmentation service 309 can then send the separated image file 323 to a processing service 316 for further processing.

Figure 4:
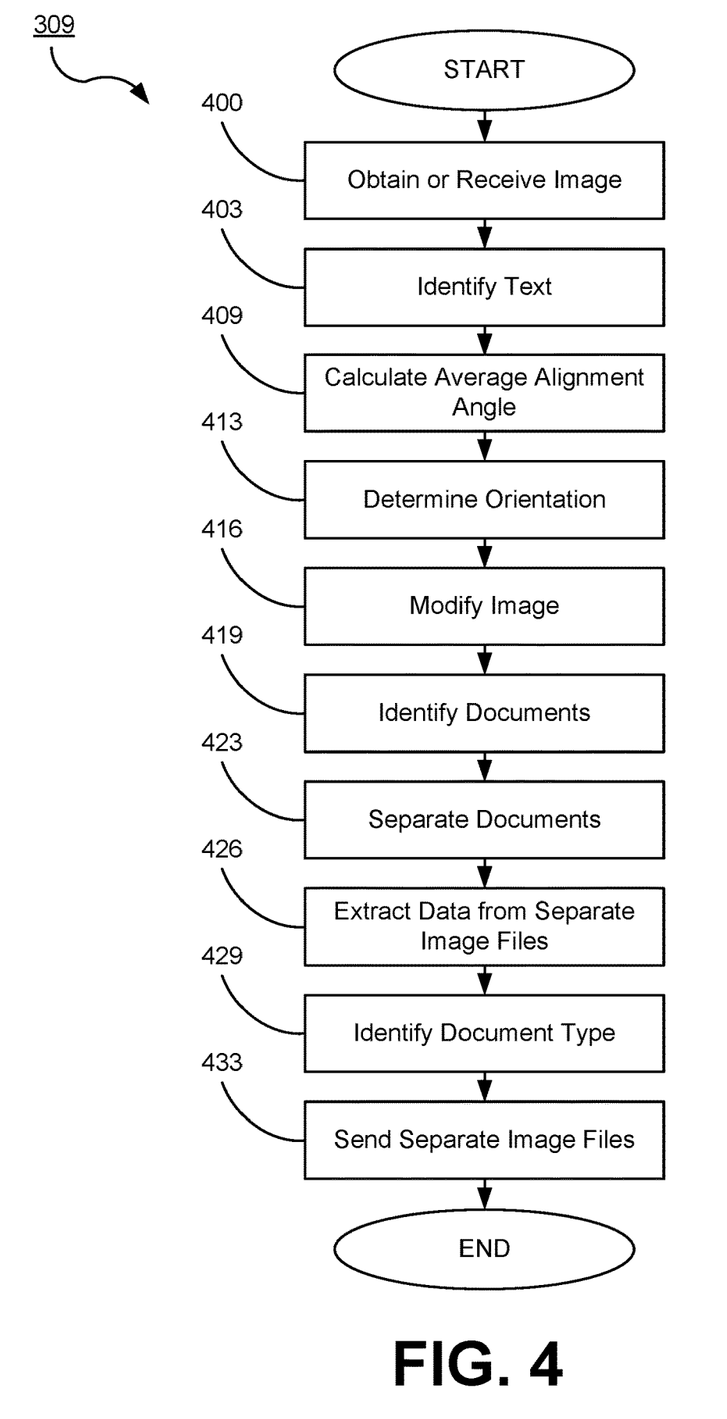
FIG. 4 is a flowchart illustrating one example of functionality implemented as portions of an application executed in a computing environment in the network environment of FIG. 3 according to various embodiments of the present disclosure.

Moving on to FIG. 4, shown is a flowchart that provides one example of the operation of a portion of the segmentation service 309. The flowchart of FIG. 4 provides merely an example of the many different types of functional arrangements that can be employed to implement the operation of the depicted portion of the segmentation service 309. As an alternative, the flowchart of FIG. 4 can be viewed as depicting an example of elements of a method implemented within the network environment 300.

Beginning with block 400, the segmentation service 309 can be executed to obtain or receive an image 106. The image can be obtained in a variety of manners.

According to various examples, the segmentation service 309 can obtain the image 106 from a data store 319. The segmentation service 309 can obtain the image 106 in response to receipt of an initiation request sent from a client application 329, an interaction with a user interface 100, or some other trigger received by the segmentation service 309. In these embodiments, the initiation request could be received by the segmentation service 309 after the image 106 is stored in the data store 319. In these instances, the initiation request could include an identifier of the image 106 to allow the segmentation service 309 to search for and obtain the image 106 from the data store 319.

In other embodiments, the segmentation service 309 can receive the image 106 from another application, system, or service within the network environment 300. For example, the client application 329, after causing the client device 103 to capture the image 106 using a camera of the client device 103, could send the image 106 to the segmentation service 309.

Next, at block 403, the segmentation service 309 can be executed to identify text within the image 106. In some embodiments, the segmentation service 309 can use a computer vision technique to identify text within the image 106. The segmentation service 309 can be language agnostic. For example, the segmentation service 309 can identify groups of alphanumerics or blocks of text by using various object identification means without regard to the language, context, or content of the text. In some implementations, optical character recognition (OCR) techniques can be used to identify individual characters, logographs, etc. in order to assist in identifying text blocks, including their orientation. In some embodiments, the segmentation service 309 can identify text from one or more documents 109 within the image 106.

Next, at block 409, the segmentation service 309 can calculate an average alignment angle for the text. In some embodiments, the segmentation service 309 can calculate an average alignment angle of the text identified at block 403. In some embodiments, the segmentation service 309 can calculate an average alignment angle of the text identified at block 403. The average alignment angle can be calculated by determining an alignment angle for each section of text or line of text and taking the average for all the text identified within the image 106. In some embodiments, the segmentation service 309 can send the average alignment angle to a user interface 100, a data store 319, a client application 329, or another application, system, or service in the network environment 300.

At block 413, the segmentation service 309 can be executed to determine an orientation of an image 106. In some embodiments, the segmentation service 309 can determine the orientation of the image 106 based at least in part on the average alignment angle calculated at block 409. The segmentation service 309 can be executed to determine the orientation of one or more documents 109 within the image 106 and/or the orientation of the image 106 itself. In some embodiments, the segmentation service 309 can determine the orientation of the one or more documents 109 in an image 106 based at least in part on the text identified at block 403. The segmentation service 309 can use the text identified at block 403 or the average alignment angle calculated at block 409 to determine the orientation of the documents 109 and the image 106 itself.

At block 416, the segmentation service 309 can be executed to modify the image 106. The segmentation service 309 can adjust various features of the image 106, such as tilt, orientation, shading, focus, scale, tone, contrast, or other aspects of the image 106. In some embodiments, the segmentation service 309 can modify the image 106 in response to receiving a request from a client application 329, an interaction with a user interface 100, or another trigger from another application, system, or service within the network environment 300. According to various examples, the segmentation service 309 can be executed to adjust at least a tilt and/or a rotation of the image 106 based at least in part on the orientation determined at block 413. In some embodiments, the image 106 is modified based at least in part on the orientation determined at block 413, the average alignment angle calculated at block 409, or the text identified at block 403. For example, the segmentation service 309 can compare the various alignment angles used to calculate the average alignment angle at block 409 to an angle of orientation determined at block 413. From such a comparison, the segmentation service 309 can identify one or more lines of text which are out of alignment with the determined orientation and adjust the tilt of those identified lines of text to conform with the orientation or average alignment angle. In some embodiments, the segmentation service 309 can store the modified image 106 in a data store 319.

Next, at block 419, the segmentation service 309 can be executed to identify documents 109 within the image 106. In some embodiments, the segmentation service 309 can identify documents 109 within the image 106 based at least in part on the modified image 106 from block 416, the orientation determined at block 413, the average alignment angle calculated at block 409, or the text identified at block 403. According to various examples, the segmentation service 309 can utilize an object detection model 313 to identify the documents 109 in an image 106. The segmentation service 309 can use the object detection model 313 to produce bounding boxes which encapsulate the documents 109 within the image 106. An example of the operation of the object detection model 313 to identify one or more documents 109 from within an image 106 is provided in the flowchart of FIG. 5.

Moving to block 423, the segmentation service 309 can be executed to separate the documents 109 from the image 106. In some embodiments, the segmentation service 309 can extract each document 109 identified at block 419 from the image 106 and generate separated image files 323 for each of the documents 109 identified. For example, the segmentation service 309 can separate the documents 109 from the image 106 by decompositing a first plurality of pixels from within a first bounding box identified in the image 106 at block 419 from a second plurality of pixels within a second bounding box identified in the image 106. In another example, the segmentation service 309 can extract the pixels of one identified document 109 into a new separated image file 323 and crop the remaining image down to another identified document 109, saving the cropped image as a new separated image file 323. The segmentation service 309 can separate the documents 109 using image decomposition software (e.g., Adobe Photoshop, etc.), command line tools (e.g., Image Magick, etc.), or by manually editing the image 106. In one example, the segmentation service 309 can perform a bit selection of all of the bits within a bounding box, extract those selected bits into a new file, and save the selected bits as a separated image file 323. The segmentation service 309 can store the separated image files 323 in a data store 319. In some embodiments, the segmentation service 309 can send the separated image files 323 to a client application 329, a user interface 100, or another application, system, or service in the network environment 300.

At block 426, the segmentation service 309 can be executed to extract data from one or more of the separated image files 323. The segmentation service 309 can extract data from one or more separated image files 323 generated at block 423 for further processing of the documents 109 within. In some embodiments, the segmentation service 309 uses computer vision techniques to identify text, images, symbols, or other various features in a document 109. The segmentation service 309 can use OCR to convert identified text to a machine-readable format for further data extraction. In such instances, the segmentation service 309 can perform text analysis such as key-word detection, word frequency, text classification, or other forms of text analysis. In various embodiments, the segmentation service 309 can extract other data from the document 109, such as the shape, size, orientation, layout, etc. The data extracted from the separated image files 323 can be stored in a data store 319, or sent to a client application 329, a user interface 100, or another application, system, or service in the network environment.

Next, at block 429, the segmentation service 309 can be executed to identify a document type of a respective document 109. In some embodiments, the segmentation service 309 can identify a document type of a document 109 in a separated image file 323. In some embodiments, the segmentation service 309 can identify the document type of a document 109 based at least in part on the data extracted at block 426, or other information. The segmentation service 309 can identify a document 109 as a check, a receipt, a bill, an invoice, a letter, or other document type. For example, the segmentation service 309 can use the data extracted at block 426 and conduct further processing to identify numeric values representative of an amount, an account number, a routing number, a check number, etc., within the document 109. By comparing the position of the identified numeric values to expected positions of such values for a standard check, the segmentation service 309 can determine that the document 109 is a check. Next, the segmentation service 309 can determine to send the document 109 and extracted data from block 426 to a check processing service for deposit. In some embodiments, the segmentation service 309 stores the document type identified in a data store 319 or sends the document type identified to a client application 329, a user interface 100, or another application, system, or service within the network environment.

At block 433, the segmentation service 309 can be executed to send separated image files 323. The segmentation service 309 can use various data about a separated image file 323 to determine where to send the separated image file 323. In some embodiments, the segmentation service 309 can use the document type identified at block 429 to determine that the separated image file 323 should be send to a processing service 316. Based at least in part on the document type identified at block 429, the segmentation service 309 can determine which of several processing services 316 the separated image file 323 should be sent to for further processing. In some embodiments, the segmentation service 309 can send the separated image files 323 to a processing service 316, a data store 319, a client application 329, a user interface 100, or another application, system, or service in the network environment 300. After block 433, the flowchart of FIG. 4 comes to an end.

Figure 5:
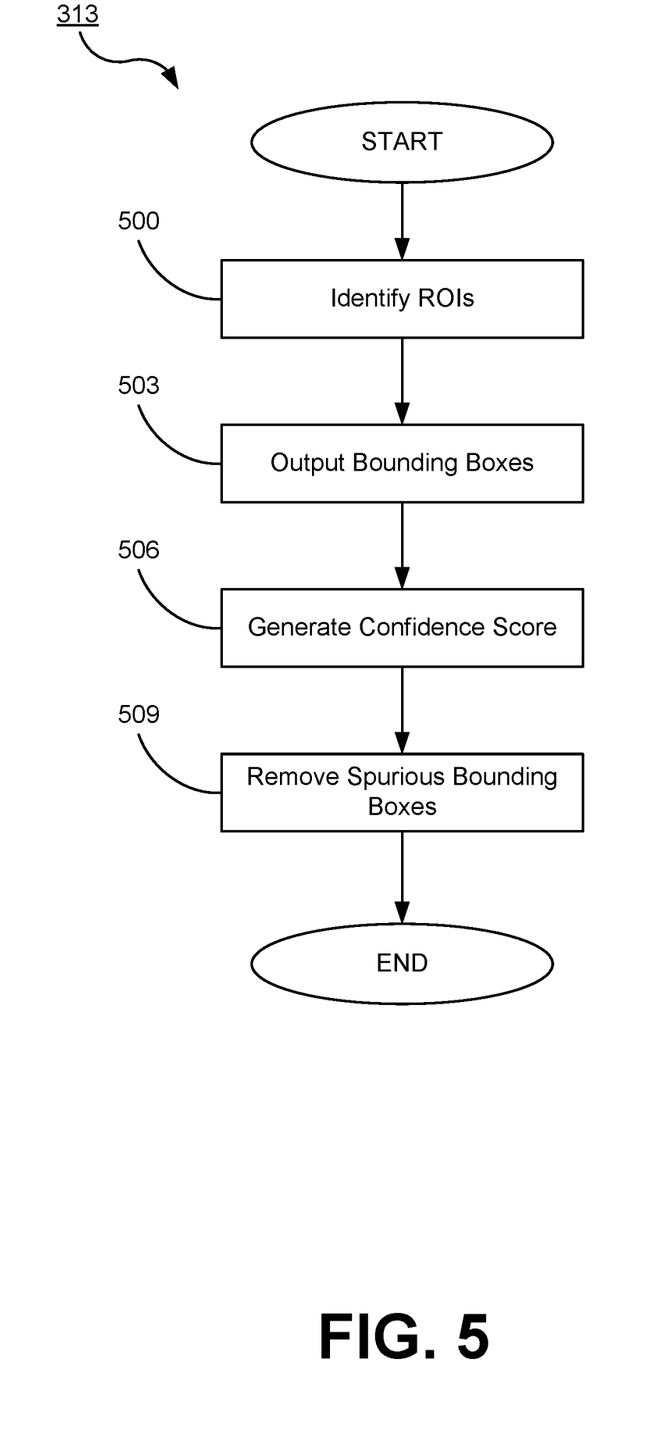
FIG. 5 is a flowchart illustrating one example of functionality implemented as portions of an application executed in a computing environment in the network environment of FIG. 3 according to various embodiments of the present disclosure.

Moving on to FIG. 5, shown is a flowchart that provides one example of the operation of a portion of the object detection model 313. The flowchart of FIG. 5 provides merely an example of the many different types of functional arrangements that can be employed to implement the operation of the depicted portion of the object detection model 313. As an alternative, the flowchart of FIG. 5 can be viewed as depicting an example of elements of a method implemented within the network environment 300.

Beginning with block 500, the object detection model 313 can be executed to identify regions of interest (ROIs). In some embodiments, the object detection model 313 can identify ROIs from an image 106 received from the segmentation service 309. The object detection model 313 can identify ROIs in the image 106 which correspond to documents 109 or regions where a potential document 109 may be located. In some embodiments, the object detection model 313 can use the text identified at block 403 of FIG. 4 to identify ROIs. In some embodiments, the object detection model 313 uses a feature map of the image 106 to determine ROIs. The object detection model 313 can utilize a Region Proposal Network to identify ROIs as well as, in some embodiments, a convolutional feature map. In some embodiments, the object detection model 313 uses an ROI Pool and a fully connected layer to identify one or more ROIs corresponding to documents 109 within an image 106.

At block 503, the object detection model 313 can output one or more bounding boxes 116. According to various examples, the object detection model 313 can output a bounding box 116 for each ROI identified at block 500. In some embodiments, the bounding boxes 116 represent a border surrounding an ROI. The bounding boxes 116 can correspond to a document 109 within the image 106. In some embodiments, the object detection model 313 outputs more bounding boxes 116 than there are documents 109 in the image 106. In some embodiments, the bounding boxes 116 are output based at least in part on the ROIs identified at block 500 and data associated with the ROIs, such as a total area, an overlap area, a height-width ratio, etc.

At block 506, the object detection model 313 can generate a confidence score. In some embodiments, the object detection model 313 outputs a confidence score for each bounding box 116. The confidence score can represent a measure of the determined accuracy of a bounding box 116, or the likelihood that the bounding box 116 is correctly identifying a document 109. The confidence scores can be stored as scores 119 along with the respective bounding box 116 and sent to a data store 319, a client application 329, a user interface 100, or other application, system, or service in the network environment 300. In some embodiments, the object detection model 313 can generate a confidence score based at least in part on an intersection over union (IoU) measure or an aspect ratio of an individual bounding box 116, as well as potentially other factors, such as a word count within a bounding box 116, etc.

Next, at block 509, the object detection model 313 can remove spurious bounding boxes 116. In some embodiments, the object detection model 313 can use a rule-based logic filter to detect and remove spurious bounding boxes 116 which were output at block 503. The filter can detect spurious bounding boxes 116 based at least in part on the confidence score generated at block 506, an overlap area between bounding boxes 116, or various other indicators that a bounding box 116 may not be accurate. In some embodiments, the object detection model 313 filters out any bounding boxes 116 identified as spurious or non-confident and extracts them from the output of the object detection model 313. The object detection model 313 can return the ROIs, confident bounding boxes 116, and confidence scores to the segmentation service 309, a client application 329, a user interface 100, or another application, system, or service in the network environment 300. After block 509, the flowchart of FIG. 5 comes to an end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 303.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
identify first text from an image;
determine a first alignment of the first text;
identify second text from the image;
determine a second alignment of the second text, wherein the first alignment differs from the second alignment;
determine a first orientation of the first text based at least in part on a calculation of an average alignment angle of the first alignment;
determine a second orientation of the second text based at least in part on a calculation of an average alignment angle of the second alignment;
identify, using an object detection model, a first document in the image based at least in part on the first orientation and a second document in the image based at least in part on the second orientation;
generate a first separate image file representing the first document; and
generate a second separate image file representing the second document.

2. The system of claim 1, wherein the machine-readable instructions, when executed, further cause the computing device to at least:
extract data from individual image files of the first and second separate image files;
identify a document type corresponding to individual image files based at least in part on the data extracted from the individual image files; and
send the individual image files to a processing service based at least in part on the document type.

3. The system of claim 1, wherein the machine-readable instructions, when executed, further cause the computing device to at least modify a tilt of the image based at least in part on the first orientation and the second orientation.

4. The system of claim 1, wherein the object detection model further comprises a region-based convolutional neural network (RCNN) and a rule-based filter.

5. The system of claim 1, wherein the machine-readable instructions which, when executed, cause the computing device to identify the first document and the second document, further cause the computing device to at least identify one or more regions of interest.

6. The system of claim 5, wherein the machine-readable instructions further cause the computing device to at least output one or more bounding boxes based at least in part on a height-width ratio of the one or more regions of interest, the one or more bounding boxes corresponding to the one or more regions of interest.

7. The system of claim 6, wherein the machine-readable instructions remove one or more spurious bounding boxes.

8. The system of claim 7, wherein the machine-readable instructions which, when executed, cause the computing device to remove one or more spurious bounding boxes, further cause the computing device to at least generate a confidence score based at least in part on an intersection over union (IoU) measure or an aspect ratio of an individual bounding box.

9. The system of claim 8, wherein the machine-readable instructions which, when executed, cause the computing device to remove one or more spurious bounding boxes, further cause the computing device to at least remove the one or more spurious bounding boxes based at least in part on the confidence score.

10. The system of claim 1, wherein the machine-readable instructions, when executed, further cause the computing device to at least modify a rotation of the image based at least in part on the first orientation and the second orientation.

11. The system of claim 1, wherein the machine readable instructions further cause the computing device to at least:
determine a first set of alignment angles corresponding to one or more respective portions of the first text and a second set of alignment angles corresponding to one or more respective portions of the second text; and
calculate the average alignment angle of the first text based at least in part on the first set of alignment angles and the average alignment angle of the second text based at least in part on the second set of alignment angles.

12. A method, comprising:
identifying, by a computing device, first text from an image and second text from the image;
calculating, by the computing device, an average alignment angle of a first alignment for the first text and an average alignment angle of a second alignment for the second text, wherein the first alignment differs from the second alignment;
determining, by the computing device, a first orientation for the first text and a second orientation for the second text based at least in part on the average alignment angle of the first alignment of the first text and the average alignment angle of the second alignment of the second text;
identifying, using an object detection model, a first document in the image based at least in part on the first orientation and a second document in the image based at least in part on the second orientation;
generating, by the computing device, a first separate image file representing the first document; and
generating, by the computing device, a second separate image file representing the second document.

13. The method of claim 12, further comprising:
extracting, by the computing device, data from individual image files of the first and second separate image files;
identifying, by the computing device, a document type corresponding to individual image files based at least in part on the data extracted from the individual image files; and
sending, by the computing device, the individual image files to a processing service based at least in part on the document type.

14. The method of claim 12, further comprising modifying, by the computing device, a tilt or a rotation of the image based at least in part on the first orientation and the second orientation.

15. The method of claim 12, wherein the object detection model further comprises a region-based convolutional neural network (RCNN) and a rule-based filter.

16. The method of claim 12, further comprising identifying, by the computing device, one or more regions of interest.

17. The method of claim 16, further comprising outputting, by the computing device, one or more bounding boxes based at least in part on a height-width ratio of the one or more regions of interest, the one or more bounding boxes corresponding to the one or more regions of interest.

18. The method of claim 17, further comprising removing, by the computing device, one or more spurious bounding boxes.

19. The method of claim 18, wherein removing one or more spurious bounding boxes further comprises generating, by the computing device, a confidence score based at least in part on an intersection over union (IoU) measure or an aspect ratio of an individual bounding box.

20. The method of claim 19, wherein removing one or more spurious bounding boxes is based at least in part on the confidence score.

21. The method of claim 12, wherein calculating the average alignment angle of the first alignment for the first text and the average alignment angle of the second alignment for the second text further comprises:
determining, by the computing device, a first set of alignment angles corresponding to one or more respective portions of the first text and a second set of alignment angles corresponding to one or more respective portions of the second text; and
calculating, by the computing device, the average alignment angle of the first text based at least in part on the first set of alignment angles and the average alignment angle of the second text based at least in part on the second set of alignment angles.

22. A non-transitory, computer-readable medium, comprising machine-readable instructions that, when executed by a processor of a computing device, cause the computing device to at least:
identify first text from an image;
determine a first alignment of the first text;
identify a second text from the image;
determine a second alignment of the second text, wherein the first alignment differs from the second alignment;
calculate an average alignment angle of the first alignment and an average alignment angle of the second alignment;
identify, using an object detection model, a first document in the image based at least in part on the average alignment angle of the first alignment and a second document in the image based at least in part on the average alignment angle of the second alignment; and
generate a first separate image file representing the first document and a second separate image file representing the second document.

23. The non-transitory, computer-readable medium of claim 22, wherein the machine-readable instructions, when executed by the processor, further cause the computing device to at least:
extract data from individual image files of the first and second separate image files;
identify a document type corresponding to individual image files based at least in part on the data extracted from the individual image files; and
send the individual image files to a processing service based at least in part on the document type.

24. The non-transitory, computer-readable medium of claim 22, wherein the machine-readable instructions, when executed by the processor, further cause the computing device to at least modify a tilt and a rotation of the image.

25. The non-transitory, computer-readable medium of claim 22, wherein the machine-readable instructions which, when executed by the processor, cause the computing device to identify the first and second documents in the image, further cause the computing device to at least:
identify one or more regions of interest; and
output one or more bounding boxes corresponding to the one or more regions of interest.

26. The non-transitory, computer-readable medium of claim 25, wherein the machine-readable instructions further cause the computing device to at least remove one or more spurious bounding boxes.

27. The non-transitory, computer-readable medium of claim 25, wherein the machine-readable instructions further cause the computing device to generate a confidence score based at least in part on an intersection over union (IoU) measure.

28. The non-transitory, computer-readable medium of claim 25, wherein the machine-readable instructions further cause the computing device to generate a confidence score based at least in part on an aspect ratio of an individual bounding box.

29. The non-transitory, computer-readable medium of claim 22, wherein the machine-readable instructions further cause the computing device to at least determine a first orientation for the first document based at least in part on the average alignment angle of first alignment, and a second orientation for the second document based at least in part on the average alignment angle of the second alignment.

30. The non-transitory, computer readable medium of claim 22, wherein the machine-readable instructions which cause the computing device to calculate an average alignment angle of the first alignment and an average alignment angle of the second alignment, further cause the computing device to at least:

determine a first set of alignment angles corresponding to one or more respective portions of the first text and a second set of alignment angles corresponding to one or more respective portions of the second text; and calculate the average alignment angle of the first text based at least in part on the first set of alignment angles and the average alignment angle of the second text based at least in part on the second set of alignment angles.

\* \* \* \* \*